(12) United States Patent
Toyao et al.

(10) Patent No.: US 6,270,153 B1
(45) Date of Patent: Aug. 7, 2001

(54) VEHICLE BODY STRUCTURE FOR AN AUTOMOTIVE VEHICLE

(75) Inventors: Hiroyuki Toyao; Syouji Tsukamoto; Toshinori Tomizawa; Yoshinori Okamoto; Akikazu Takai; Kenji Kimura, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/497,229

(22) Filed: Feb. 3, 2000

(30) Foreign Application Priority Data

Feb. 19, 1999 (JP) ................................................. 11-042287

(51) Int. Cl.7 ................................................. B62D 23/00
(52) U.S. Cl. ............................................................ 296/204
(58) Field of Search .................................... 296/204, 186, 296/30, 203.01, 203.02, 203.03, 203.04

(56) References Cited

U.S. PATENT DOCUMENTS

| 3,108,836 | * | 10/1963 | Deckert . | |
|---|---|---|---|---|
| 4,457,555 | * | 7/1984 | Draper | 296/186 |
| 6,203,099 | * | 3/2001 | Iwatsuki | 296/204 |

FOREIGN PATENT DOCUMENTS

| 0285131 | * | 10/1988 | (EP) | 296/204 |
|---|---|---|---|---|
| 126267 | * | 4/1961 | (FR) | 296/204 |
| 0205276 | * | 12/1982 | (JP) | 296/204 |
| 0205277 | * | 12/1982 | (JP) | 296/204 |
| 0049520 | * | 3/1983 | (JP) | 296/204 |
| 405097065 | * | 4/1993 | (JP) | 296/204 |

* cited by examiner

*Primary Examiner*—D. Glenn Dayoan
*Assistant Examiner*—Patricia Engle
(74) *Attorney, Agent, or Firm*—Armstrong, Westerman, Hattori, McLeland & Naughton, LLP (57) ABSTRACT

A vechicle body structure for an automotive vehicle comprising front side frames (21, 21) provided left and right at a front portion of a vehicle body (10) so as to hold a longitudinal center line of the vehicle body therebetween, rear side frames (26, 26) provided left and right at a rear portion of the vehicle body so as to hold the longitudinal center line of the vehicle body therebetween and side sills (23, 23) or floor frames (27, 27) provided left and right so as to hold the longitudinal center line of the vehicle body therebetween and lower than the front side frames and rear side frames when viewed from the side of the vehicle body, the front side frames, rear side frames and side sills or floor frames being connected to each other, and further a floor tunnel having the bottom-open U-shaped cross-sectional structure which extends along the longitudinal center line of the vehicle body between said front side frames and said rear side frames and protrudes upwardly of the side sills (23, 23) or floor frames (27, 27). Auxiliary frames (52, 52) each having a closed cross-sectional structure are provided at an upper portion of the floor tunnel. The auxiliary frames are joined to the front side frames and the rear side frames via extensions (53, 53, 54, 54), each having a closed cross-sectional structure.

7 Claims, 8 Drawing Sheets

VEHICLE BODY STRUCTURE FOR AN AUTOMOTIVE VEHICLE

BACKGROUND OF THE INVENTION

The present invention relates to an improved technology for a vehicle body structure of an automotive vehicle.

Figure 9A:
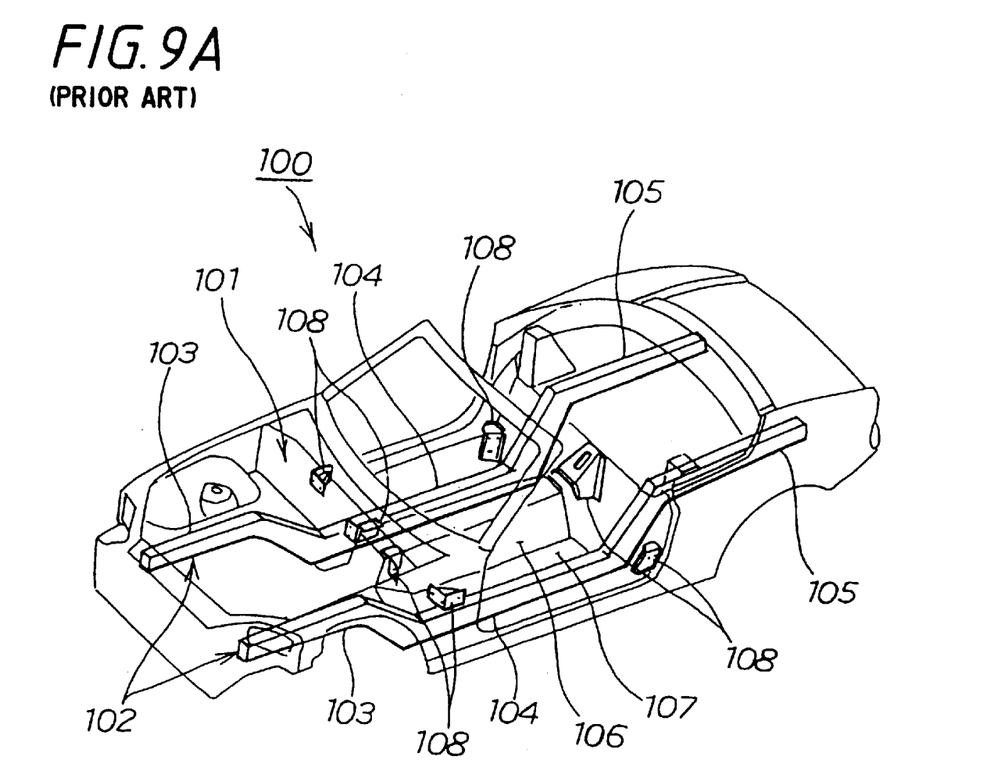
FIGS. 9A and 9B show respectively conceptual views of a conventional vehicle body structure.
Figure 9B:
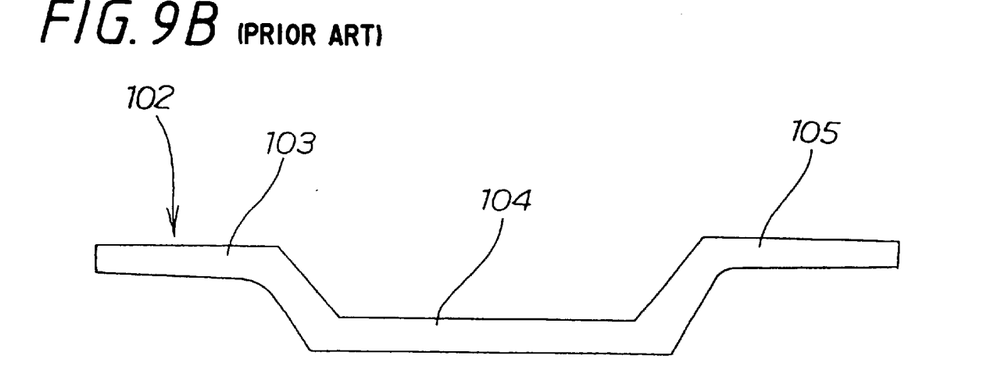

FIGS. 9A and 9B are conceptual drawings of a conventional vehicle body structure and show a typical example of a vehicle body 101 of a convertible or cabriolet 100.

FIG. 9A shows that the vehicle body 101 comprises a monocoque body having incorporated therein left and right side members 102, 102 and cross members (not shown) extending between these side member 102, 102. The side member 102 comprises a front side frame 103 located at a front portion of the vehicle body, a floor frame 104 located at a longitudinal center of the vehicle body and a rear side frame 105 located at a rear portion of the vehicle body, which are joined together in that order. The vehicle body 101 also has a floor tunnel 106 disposed at the center of the vehicle body. Reference numeral 107 denotes a floor panel.

FIG. 9B shows the structure of the side member 102 when viewed from the side of the vehicle body in which the floor frame 104 is disposed lower than the front and rear side frames 103, 105 so as to secure a certain dwelling performance inside a passenger compartment.

However, the vehicle 100 tends to be subject to torsional and/or bending moment while running, and the vehicle body 101 of the vehicle 100 is required to provide a sufficient rigidity. In particular, in the case of a convertible, since it has no fixed roof, an upper portion of a vehicle body thereof cannot be supported by a roof, and therefore the rigidity of the vehicle body 101 must be increased to such an extent that a decrease in rigidity due to the lack of a roof can be compensated for. In addition, the side member 102 is constructed as bent when viewed from the side thereof, and here again the rigidity of the vehicle body 101 must be increased to such an extent that a decrease in rigidity due to the bent side member can be compensated for.

In these circumstances, a number of reinforcement members 108 . . . are provided at portions of the vehicle body where an increase in rigidity is required for partial reinforcement. However, the addition of a number of reinforcement members 108 as described above results in an increase in vehicle weight, this preventing the reduction in the weight of the vehicle body 101.

SUMMARY OF THE INVENTION

An object of the present invention is to increase the rigidity of a vehicle body while suppressing the increase in the weight thereof.

The above object can be attained by a vehicle body structure for an automotive vehicle, according to the present invention, comprising front side frames provided left and right at a front portion of a vehicle body so as to hold a longitudinal center line of the vehicle body therebetween, rear side frames provided left and right at a rear portion of the vehicle body so as to hold the longitudinal center line of the vehicle body therebetween and floor frames or side sills provided left and right so as to hold the longitudinal center line of the vehicle body therebetween and lower than the front side frames and the rear side frames when viewed from the side of the vehicle body, the front side frames, rear side frames and floor frames or side sills being connected to each other, and further a floor tunnel having a bottom-opened U-shaped cross-sectional structure which extends along the longitudinal center line of the vehicle body between the front side frames and the rear side frames and protrudes upwardly of the floor frames or side sills, wherein auxiliary frames each having a closed cross-sectional structure are provided at an upper portion of the floor tunnel, and wherein the auxiliary frames are joined to the front side frames and the rear side frames via extensions each having a closed cross-sectional structure.

The auxiliary frames provided on the floor tunnel each have the closed cross-sectional structure and therefore they each have a high rigidity.

The front side frames and rear side frames that are connected to each other with the floor frames or side sills which are disposed longitudinally centrally of the vehicle body are further connected to each other with the auxiliary frame and the extensions thereof. Since the frames at the front portion of the vehicle body and the frames at the rear of the vehicle body are connected to each other not only with the floor frames or side sills but also with the auxiliary frame having the high rigidity, the rigidity of the vehicle body is increased while it is well balanced as a whole from the front to rear portions of the vehicle body. Consequently, the rigidity of the vehicle body can increased effectively and markedly when compared with the conventional manner in which the rigidity of the vehicle body is partially reinforced.

In the above-mentioned vehicle body structure according to the present invention, it is preferable that the front side frames, the rear side frames, the auxiliary frames constructed at the upper portion of the floor tunnel and the extensions for connecting the front side frames, the rear side frames and the auxiliary frames together are provided at substantially the same level when viewed from the side of the vehicle body.

With a view to securing a certain level of dwelling performance in the passenger compartment, the floor frames or side sills that are disposed longitudinally centrally of the vehicle body are placed lower than the front and rear side frames. Even in such a case, since the auxiliary frame and extensions are disposed substantially at the same level as those of the front and rear side frames, the torsional and bending rigidities of the vehicle body as a whole are sufficiently high.

Furthermore, since when collision energy is applied to the front portion of the vehicle body, the energy is transmitted from the front side frames to the rear side frames via the auxiliary frame which are placed at substantially the same level, the collision energy so applied can be efficiently absorbed by the entirety of those respective constituent members.

DETAILED DESCRIPTION OF THE PREFERRED EMBODIMENTS

Referring to the accompanying drawings, a mode of operation of the present invention will be described.

In the accompanying drawings, "front," "rear," "left," "right," "up," and "down" indicate directions as viewed from the driver's position, respectively, and Fr, Rr, L, R and CL designate, respectively, front side, rear side, left-hand side, right-hand side and vehicle body center (a transverse center or a longitudinal center line of a vehicle body). In addition, the drawings are to be looked at in a direction in which reference numerals are oriented therein.

Figure 1A:
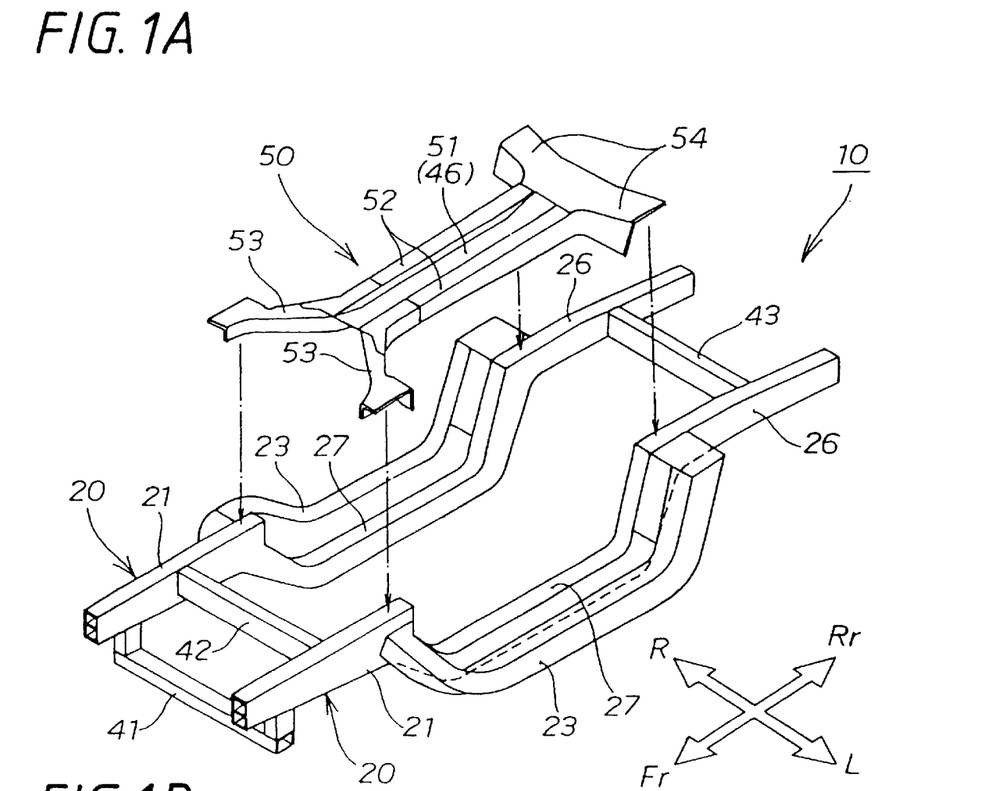
FIGS. 1A to 1C show respectively conceptual views of a vehicle body structure according to the present invention.
Figures 1B, 1C:
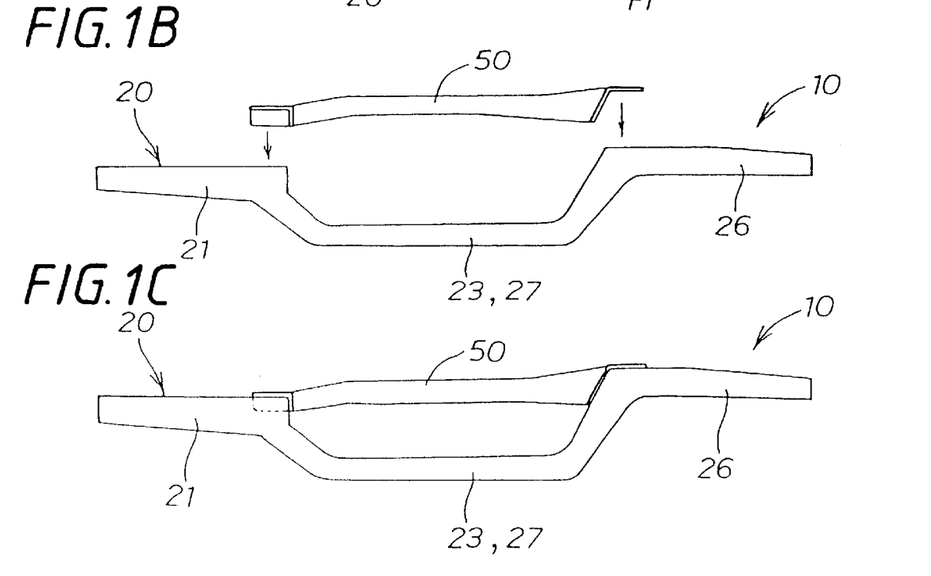

FIGS. 1A to 1C are conceptual drawings of a vehicle body structure according to the present invention and show diagrammatically a vehicle body 10 of a convertible or cabriolet as a vehicle.

FIG. 1A shows that the vehicle body 10 is a reinforced frame of a monocoque body having incorporated therein left and right side members 20, 20 and cross members 41, 42, 43 interposed to extend between these left and right side members 20, 20.

The side member 20 is a member comprising a front side frame 21 disposed at a front portion of the vehicle body, a side sill 23 disposed transversely outwardly and longitudinally centrally of the vehicle body or a floor frame 27 disposed transversely inwardly and longitudinally centrally of the vehicle body and a rear side frame 26 disposed at a rear portion of the vehicle body which are joined together in that order. In order to secure a certain level of dwelling performance inside a passenger compartment, the side sill 23 and the floor frame 27 are positioned lower than the front and rear side frames 21, 26.

In this embodiment of the present invention, the left and right front side frames 21, 21 and the left and right rear side frames 26, 26 which are connected to each other with the side sills 23, 23 and the floor frames 27, 27 that are disposed longitudinally centrally of the vehicle body are further connected to each other by means of a main reinforcement member 50, to thereby increase further the rigidity of the vehicle body 10. The reinforcement member 50 will be described in detail later.

To be specific, as shown in FIG. 1B, the main reinforcement member 50 is placed to extend between rear portions of the front side members 21 and front portions of the rear side members 26. In addition, as shown in FIG. 1C, the front side frames 21, the rear side frames 26 and the main reinforcement member 50 are joined to each other at substantially the same level.

Figure 2:
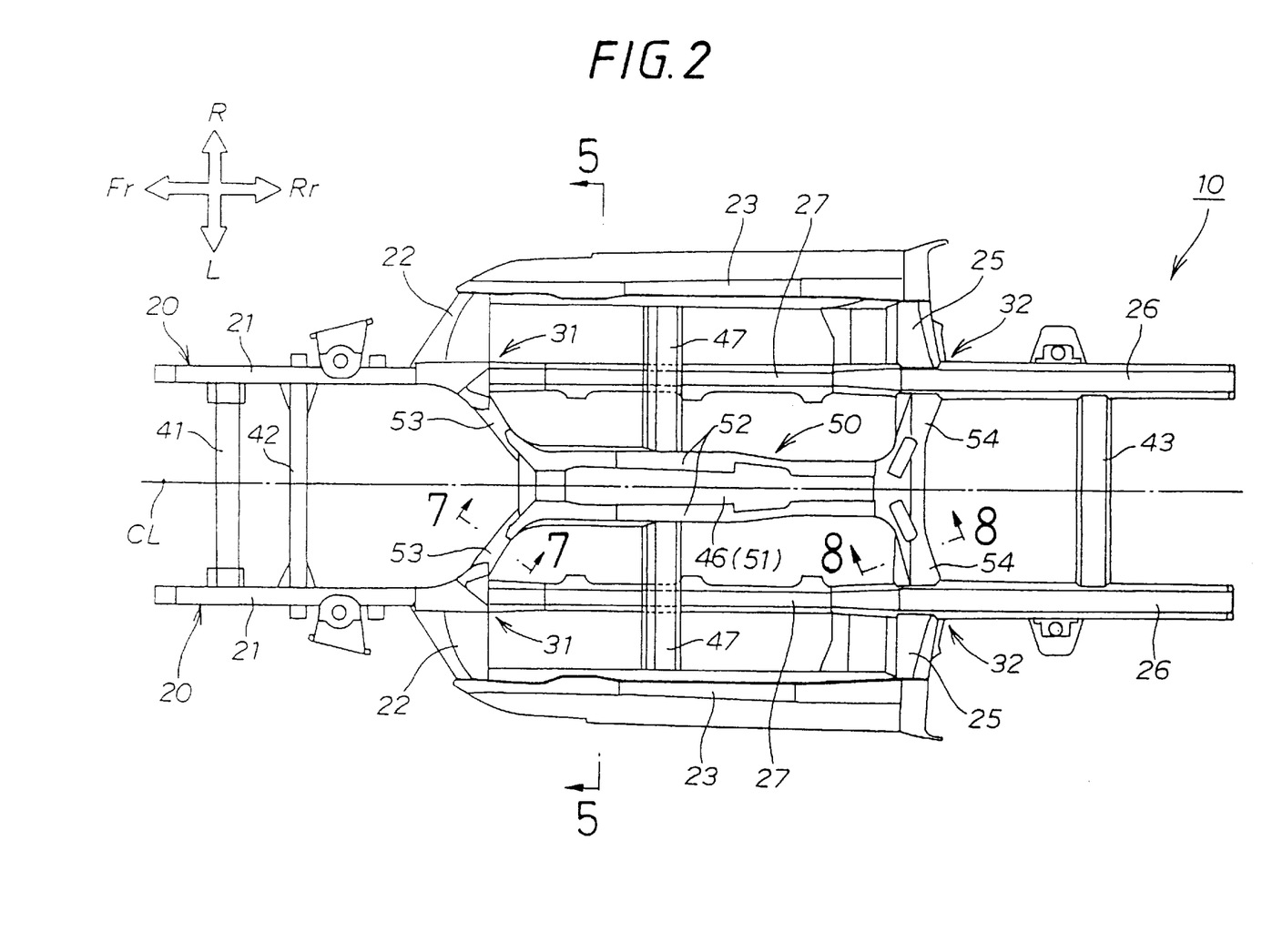
FIG. 2 shows a plan view of the vehicle body structure according to the present invention.

Referring to FIG. 2 and those following thereto, a construction of the vehicle body 10 will be described in detail below.

FIG. 2 is a plan view of the vehicle body structure according to the present invention, in which floor panels are omitted. As a matter of convenience, however, out of the floor panels only a floor tunnel is shown.

To describe a specific construction of the left side member 20, the left side member 20 comprises the front side frame 21, a side outrigger 22 joined to the rear portion of the front side frame 21 and extending transversely outwardly, the side sill 23 joined to a side edge portion of the side outrigger 22, a connecting member 25 jointed to a rear portion of the side sill 23, the rear side frame 26 joined to a front portion of the connecting member 25 and the floor frame 27 extending from the rear portion of the front side frame 21 to the front portion of the rear side frame 26 so as to be joined to those frames.

A joint portion where the front side frame 21, the side outrigger 22 and the floor frame 27 are joined together is hereinafter referred to as a "front joint portion 31." In addition, a joint portion where the connecting member 25, the rear side frame 26 and the floor frame 27 are joined together is herein after referred to as a "rear joint portion 32."

The front side frame 21, the floor frame 27 and the rear side frame 26 extend linearly in a longitudinal direction when viewed from the top. The front side frame 21 and the side sill 23 have a substantially rectangular closed cross-sectional structure, while the rear side frame 26 and the floor frame 27 have a top-opened U-shape cross-sectional structure. The right side member 20 is identical to the left side member 20 in construction.

This figure shows a construction in which a first front-most cross member 41 and a second cross member 42 rearward of the first cross member are placed so as to extend between the left and right front side frames 21, 21, and a third cross member 43 is so placed between the left and right rear side frames 26, 26, and in addition, the elongated floor tunnel 46 is disposed to extend longitudinally between the front side frame 21 and the rear side frame 26 along a vehicle body center CL.

As is clear from the above description, the vehicle body 10 is constructed by connecting together the left and right front side frames 21, 21 which are provided at the front portion thereof so as to hold the vehicle body center CL (the longitudinal center line of the vehicle) therebetween, the left and right rear side frames 26, 26 which are provided at the rear portion of the vehicle body so as to hold the vehicle body center CL therebetween, and the left and right side sills 23 or floor frames 27, 27 which are provided lower than the front side frames 21, 21 and rear side frames 26, 26 when viewed from the side of the vehicle body 10 in such a manner as to hold the vehicle body center CL therebetween and providing the floor tunnel 46 so as to extend along the vehicle body center CL between the front side frames 21, 21 and the rear side frames 26, 26 in such a manner as to protrude upwardly above the side sills 23, 23 or the floor frames 27, 27.

Figure 3:
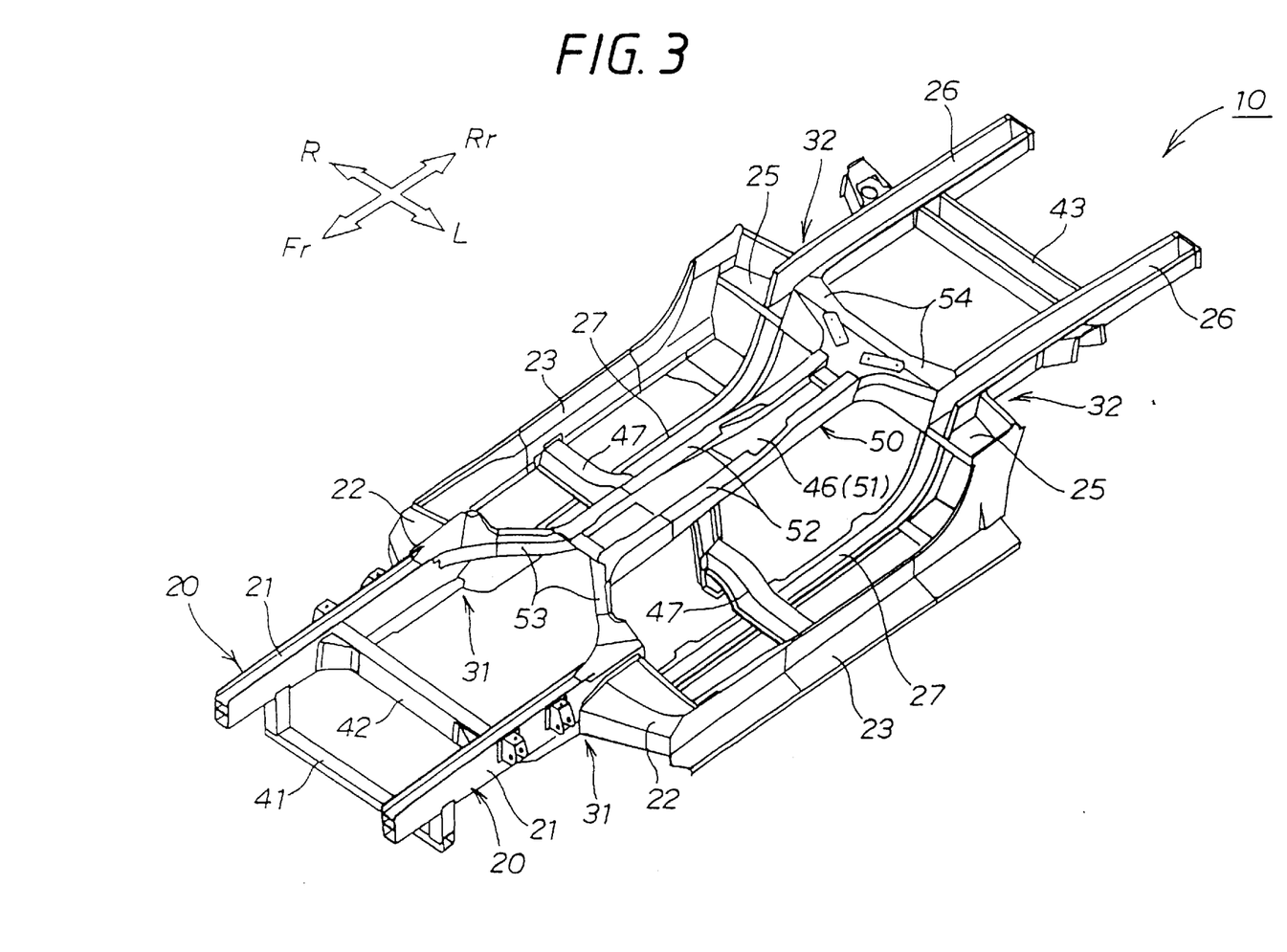
FIG. 3 shows a perspective view of the vehicle body structure according to the present invention.

FIG. 3 is a perspective view of the vehicle body structure according to the present invention, showing the main reinforcement member 50 with the floor tunnel and the floor panels being omitted.

This figure shows a construction in which floor cross members 47, 47 are placed so as to extend transversely from a transverse center portion of the vehicle body to the left and right side sills 23, 23, respectively, over the left and right floor frames 27, 27 for joining thereto, whereby the floor panels not shown are reinforced.

The first cross member 41 is a bar member having a rectangular closed cross-sectional structure which is adapted to extend across the front side frames 21, 21 therebelow. The second cross member 42 is a bar member having a rectangular closed cross-sectional structure. The third cross member 43 is a bar member having a top-opened U-shaped cross-sectional structure.

The main reinforcement member 50 is structured in such a manner that auxiliary frames 52, 52 each having a closed cross-sectional structure are provided atop an upper portion of the floor tunnel (refer to FIG. 2) and that these auxiliary frames 52, 52 so provided are then joined to the front side frames 21, 21 and the rear side frames 26, 26, respectively, via extensions 53, 53, and 54, 54, each having a closed cross-sectional structure.

To be specific, the main reinforcement member 50 is an X-shaped cross member when viewed from the top, in which the left and right auxiliary frames 52, 52 are placed so as to extend longitudinally along sides of the upper portion of the floor tunnel 46 and these auxiliary frames 52, 52 are joined to the longitudinal sides of the floor tunnel 46. In addition, the front extensions 53, 53 are provided so as to extend from the front portions of the left and right auxiliary frames 52, 52 to the left and right front joint portions 31, 31 for joining thereto, while the rear extensions 54, 54 are provided to extend from the rear portions of the left and right auxiliary frames 52, 52 to the left and right rear joint portions 32, 32 for joining thereto.

In other words, the main reinforcement member 50 comprises the auxiliary frames 52, 52 which are joined to the front side frames 21, 21 and the rear side frames 26, 26 via the extensions 53, 53 and 54, 54, respectively, each extension having a closed cross-sectional structure.

By connecting the left and right front side frames 21, 21 with the left and right rear side frames 26, 26 by means of the main reinforcement member 50 constructed as described above these front side frames 21, 21 can be connected to the rear side frames 26, 26 by means of the floor tunnel 46, the auxiliary frames 52, 52 and the front and rear extensions 53, 53, 54, 54.

Figure 4:
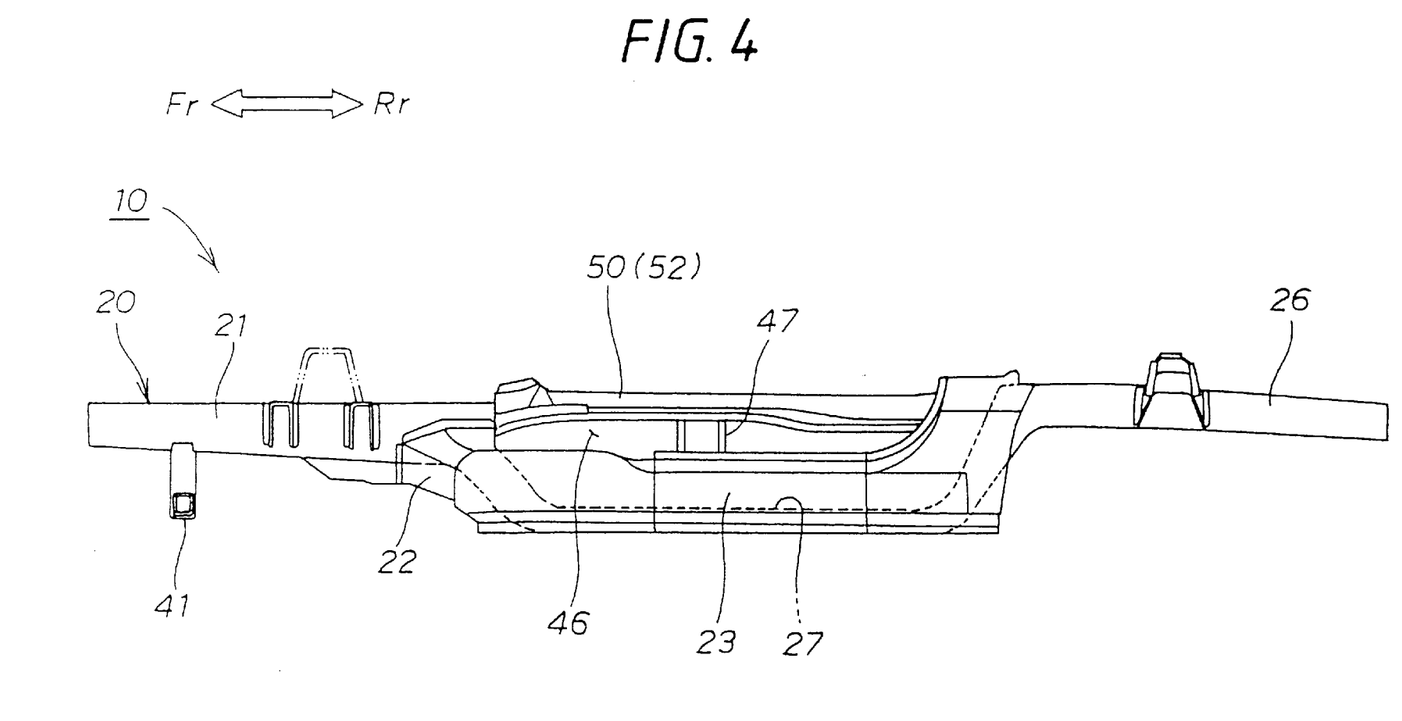
FIG. 4 shows a left side view of the vehicle body structure according to the present invention.

FIG. 4 is an left side view of the vehicle body structure according to the present invention with the floor panels being omitted. As a matter of convenience, however, only the floor tunnel is shown.

This figure shows the construction in which the side sill 23 and the floor frame 27 are disposed lower than the front side frame 21 and the rear side frame 26, and in which the front side frame 21, the rear side frame 26 and the main reinforcement member 50 are joined together at substantially the same level when viewed from the side of the vehicle body 10.

Figure 5:
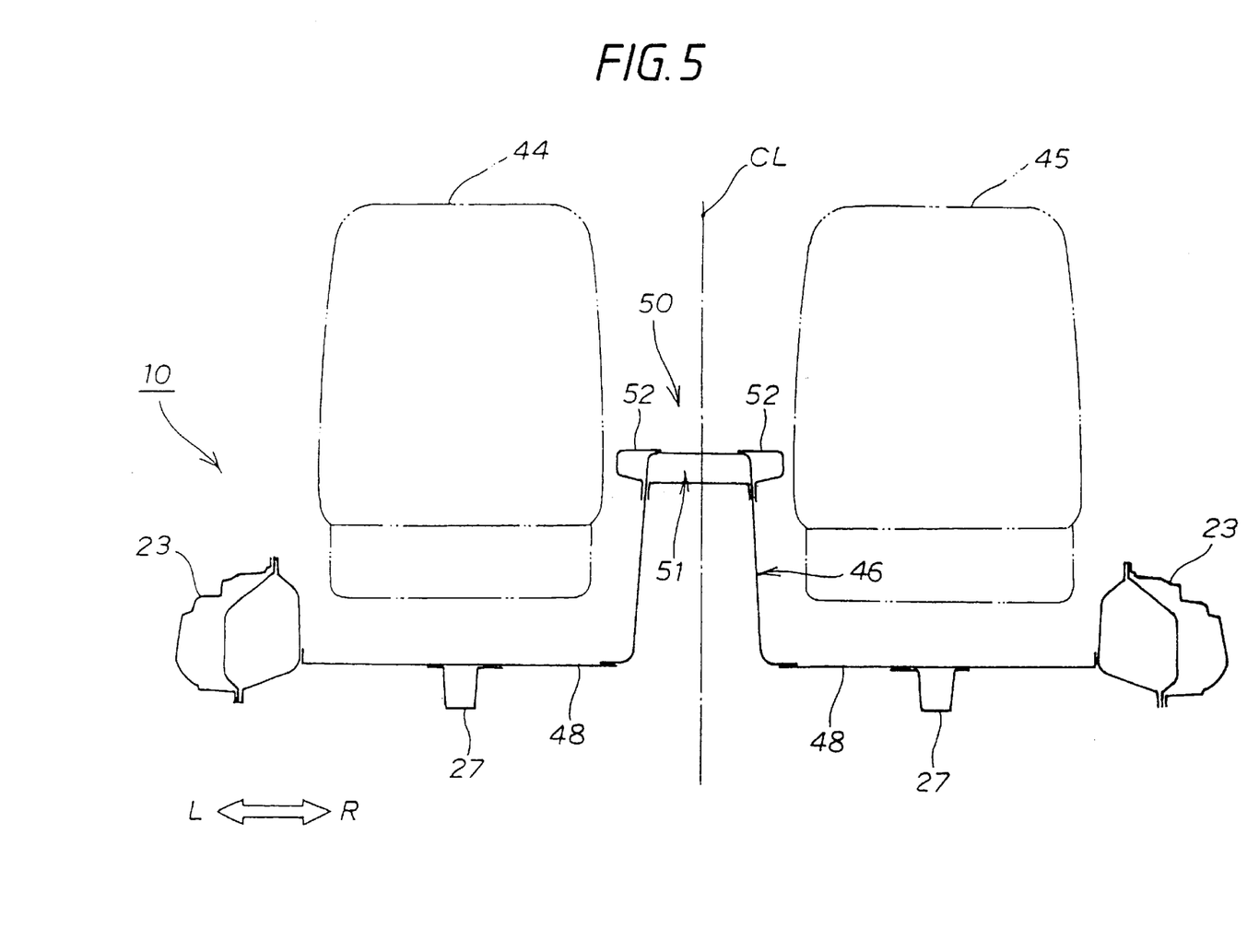
FIG. 5 shows a cross-sectional view taken along the line 5—5 of FIG. 2.

FIG. 5 is a cross-sectional view taken along the line 5—5 of FIG. 2. In the figure, the floor tunnel 46 having a bottom-opened U-shaped cross-sectional structure is placed between a driver's seat and a front passenger seat, which are shown by imaginary lines, to extend longitudinally centrally of the vehicle body. Then, left and right lower ends of the floor tunnel 46 so placed are then joined to inner ends of left and right floor panels 48, 48 and these floor panels 48, 48 are joined to the left and right side sills 23, 23 at outer ends thereof, respectively.

The floor panels 48, 48 can be reinforced by overlaying them on the floor frames 27, 27 each having the top-opened U-shaped cross-sectional structure for joining thereto. Moreover, the floor frames 27, 27 are allowed to have a substantially rectangular closed cross-sectional structure when the openings of the floor frames 27, 27 are closed by the floor panels 48, 48, respectively, whereby the rigidity thereof can be increased.

Figure 6:
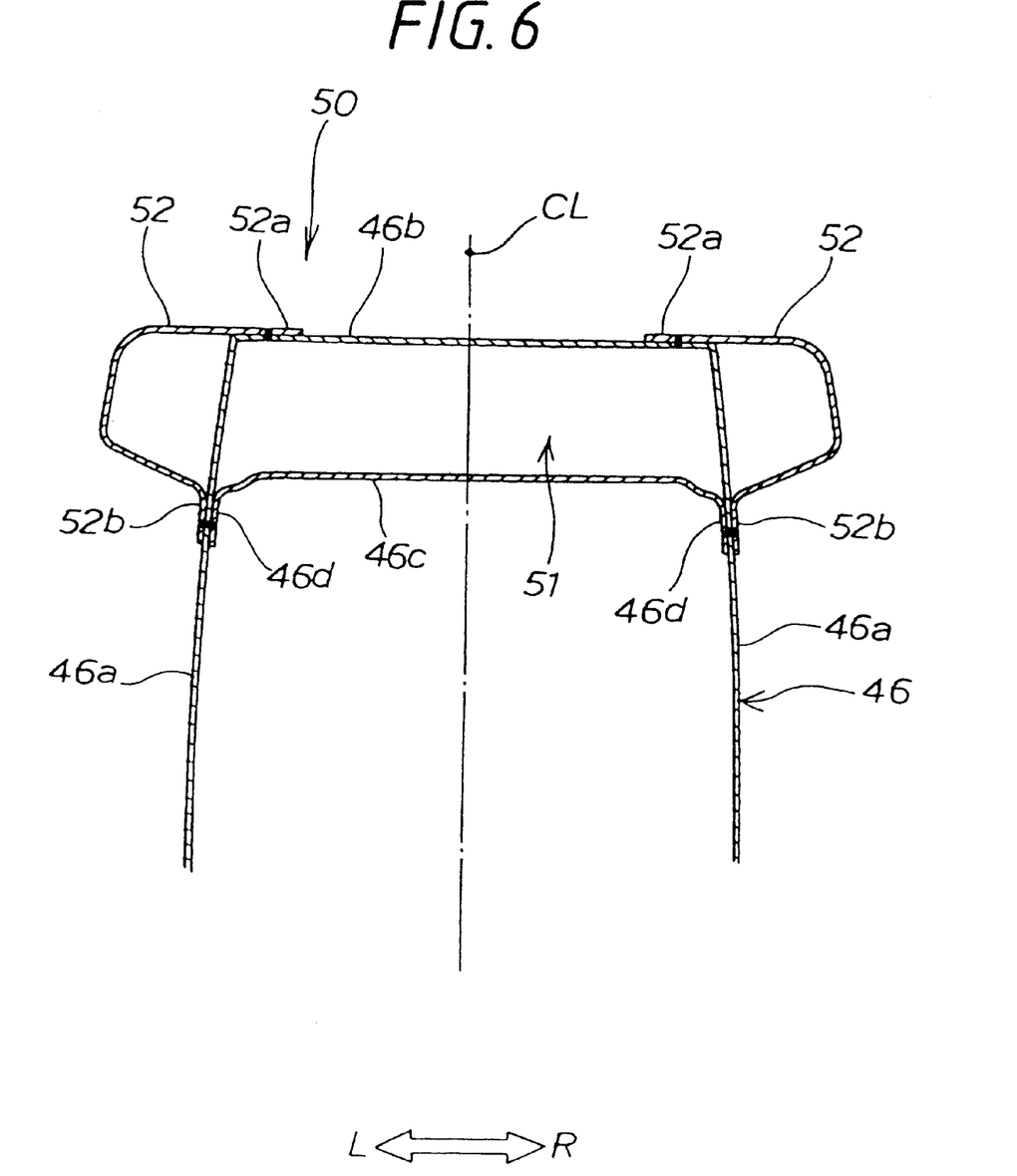
FIG. 6 shows a cross-sectional view of a main part of an upper portion of a floor tunnel according to the present invention.

FIG. 6 is a cross-sectional view showing a main part of the upper portion of the floor tunnel according to the present invention, and the figure is an enlarged view of the main part shown in FIG. 5 and shows a cross-sectional structure of the main reinforcement member 50.

The floor tunnel 46 comprises left and right side panels 46a, 46a and a ceiling panel 46b placed to extend between upper portions of these left and right side panels 46a, 46a, and further more, there is a lateral panel 46c provided in the interior of the upper portion so as to extend between the left and right side panels 46a, 46a to thereby form the upper portion into a substantially rectangular closed cross-sectional structure, this resulting in an increase in the rigidity of the floor tunnel. In other words, the rigidity is increased by providing a central auxiliary frame portion 51 having a closed cross-sectional structure at the upper portion of the floor panel 46.

The left and right auxiliary frames 52, 52 are placed so as to extend along the sides of the upper portion of the floor tunnel 46, in other words, left and right sides of a central auxiliary frame portion 51 for joining thereto. Thus, the auxiliary frames 52, 52 are a reinforcement member having a substantially U-shaped cross-section when viewed from the back in the longitudinal direction. To describe in detail, the left and right auxiliary frames 52, 52 are a member formed into a substantially rectangular closed cross-sectional structure by joining upper edges 52a, 52a thereof to the ceiling panel 46b of the floor tunnel 46, respectively and overlaying lower edges 52b, 52b thereof on the side panels 46a, 46a of the floor tunnel 46 and edge portions 46d, 46d of the lateral panel 46c for joining thereto.

As is clear from the above description, the main reinforcement member 50 is constructed so as to increase the torsional and bending rigidities by joining integrally with each other the auxiliary frames 52, 52 and the central auxiliary frame portion 51 which each have a closed cross-sectional structure and are laterally arranged in a row.

Figure 7:
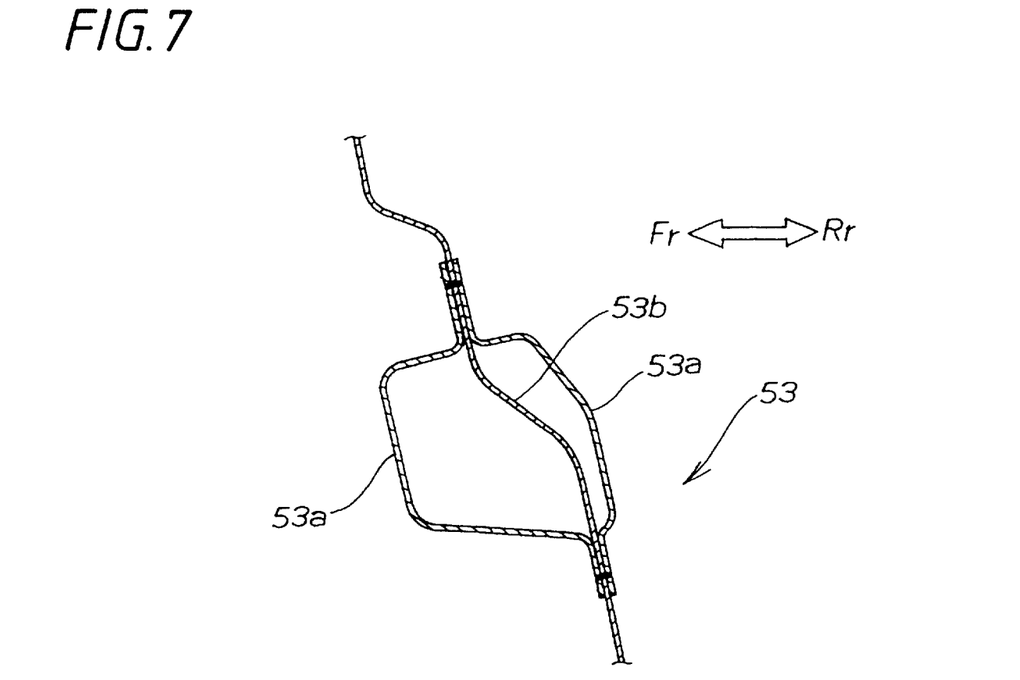
FIG. 7 shows a cross-sectional view taken along the line 7—7 of FIG. 2.

FIG. 7 is a cross-sectional view taken along the line 7—7 of FIG. 2 and shows a cross-section of the front extension 53.

The extension 53 is a member formed into a closed cross-sectional structure by allowing substantially U-shaped cross-sectional structures 53a, 53a that are disposed to confront each other on open sides thereof to overlap each other with a plate-like dashboard 53b being held therebetween so as to be joined together.

Figure 8:
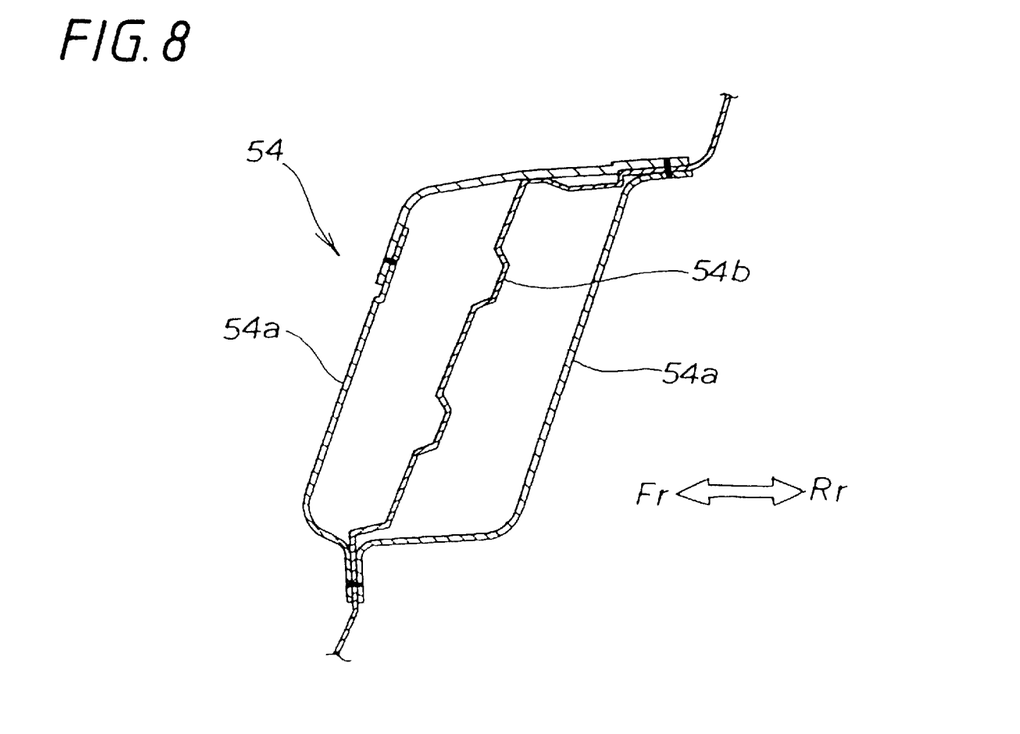
FIG. 8 shows a cross-sectional view taken along the line 8—8 of FIG. 2.

FIG. 8 is a cross-sectional view taken along the line 8—8 of FIG. 2 and shows the rear extension 54.

The extension 54 is a member formed into a closed cross-sectional structure by allowing substantially L-shaped cross-sectional structures 54a, 54a that are disposed to confront each other to overlap each other with a plate-like a rear floor panel 54b being held therebetween so as to be joined together.

Next, referring to FIGS. 1A to 1C, a function of the vehicle body structure of the vehicle constructed as described above will be described below.

The central auxiliary frame portion 51 (the upper portion of the floor tunnel 46), the auxiliary frames 52, 52 and the front and rear extensions 53, 53, 54, 54 are all the closed cross-sectional structures and therefore they can provide a high rigidity. As a result of this, the main reinforcement member 50 can provide high torsional and bending rigidities which comprises the central auxiliary frame portion 51, the auxiliary frames 52, 52 and the front and rear extensions.

Since the front side frames 21, 21 and the rear side frames 26, 26 which are spaced away from each other are connected to each other with not only the side sills 23, 23 and the floor frames 27, 27 but also the main reinforcement member 50 which has a higher rigidity, the rigidity of the vehicle body 10 is increased in a balanced fashion as a whole from the front portion to the rear portion thereof. Therefore, it is possible to increase the torsional and bending rigidities of the vehicle body 10 efficiently and markedly by means of the more reasonable and lighter reinforcement member 50 than the prior art example in which the vehicle body is partially reinforced at only portions needing reinforcements.

Furthermore, as shown in FIG. 1C, even though the front and rear side frames 21, 26 are disposed higher than the side sills 23 and the floor frames 27 which are both disposed in the longitudinal center of the vehicle body, since the main reinforcement member 50 is situated at the same level as those of the front and rear side frames 21, 26, sufficient torsional and bending rigidities can be provide.

Moreover, when a collision energy is applied to the front portion of the vehicle body 10, since it is transmitted from the front side frames 21 to the rear side frames 26 via the main reinforcement member 50, the collision energy so applied can be absorbed in an efficient fashion by the entirety of these members 21, 26, 50 involved.

In addition, in the above mode of operation of the present invention, the type of a vehicle to which the present invention is applied is not limited to the convertible or cabriolet, but the invention may be applied to a normal passenger car.

Further, note that in the specification, the word "join" when used herein means a fixation of two or more members to each other by virtue of welding, caulking or the like.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

Being constructed as described heretofore, the present invention provides the following advantages.

According to the invention, since the auxiliary frames each comprising a closed cross-sectional structure are provided at the upper portion of the floor tunnel and the auxiliary frames are then connected to the front side frames and rear side frames via the extensions each having a closed cross-sectional structure, the front side frames and rear side frames that are connected to each other with the longitudinally centrally disposed floor frames or side sills can further be connected to each other with the auxiliary frames providing a higher rigidity and the extensions thereof. Thus, since the frames at the front portion of the vehicle body and the frames at the rear portion thereof which are spaced away a certain distance from each other can be connected with not only the floor frames or side sills but also the auxiliary frames having a higher rigidity and the extensions thereof, it is possible to increase the rigidity of the entirety of the vehicle body from the front portion to the rear portion of the vehicle in a well-balanced fashion. Consequently, it is possible to increase the torsional and bending rigidities of the vehicle body efficiently and markedly by means of the more reasonable and lighter reinforcement member than the prior art example in which the vehicle body is partially reinforced at only portions needing reinforcements.

According to the invention, since the front side frames, the rear side frames, the auxiliary frames constructed at the upper portion of the floor tunnel and the extensions for connecting the front side frames, the rear side frames and the auxiliary frames together are provided at substantially the same level when viewed from the side of the vehicle body, sufficient torsional and bending rigidities of the vehicle body can be secured.

Furthermore, when a collision energy is applied to the front portion of the vehicle body, the energy is then transmitted from the front side frames to the rear side frames Via the auxiliary frames which are all disposed at substantially the same level. Consequently, the collision energy so applied can be absorbed in an efficient fashion with the entirety of those respective constituent members.

What is claimed is:

1. A vehicle body structure for an automotive vehicle comprising:

left and right front side frames provided at a front portion of a vehicle body so as to hold a longitudinal center line of said vehicle body therebetween, left and right rear side frames provided at a rear portion of said vehicle body so as to hold said longitudinal center line of said vehicle body therebetween;

a first member and a second member disposed lower than said front side frames and said rear side frames when viewed from the side of said vehicle body, said first member being left and right floor frames provided so as to hold said longitudinal center line of said vehicle body therebetween, said second member being left and right side sills provided so as to hold said longitudinal center line of said vehicle body therebetween, said front side frames, rear side frames and at least one of said first and second members being connected to each other;

a floor tunnel extending along the longitudinal center line of said vehicle body between said front side frames and said rear side frames, said floor tunnel defining a bottom-opened substantially U-shaped cross-sectional structure;

auxiliary frames provided at an upper portion of said floor tunnel and each defining a closed cross-sectional annular structure; and extending portions extending from said auxiliary frames to join said auxiliary frames to said front side frames and said rear side frames and defining a closed cross-sectional annular structure.

2. A vehicle body structure for an automotive vehicle as set forth in claim 1, wherein said front side frames, said rear side frames, said auxiliary frames constructed at the upper portion of said floor tunnel and said extending portions for connecting said front side frames, said rear side frames and said auxiliary frames together are provided at substantially the same level when viewed from the side of said vehicle body.

3. A vehicle body structure for an automotive vehicle as set forth in claim 1, wherein said auxiliary frames define the closed cross-sectional annular structure in conjunction with said floor tunnel by attaching said auxiliary frames onto surfaces of the upper portion of said floor tunnel.

4. A vehicle body structure for an automotive vehicle as set forth in claim 1, wherein a central auxiliary frame portion defining a closed cross-sectional annular structure is formed between said auxiliary frames at the upper portion of said floor tunnel.

5. A vehicle body structure for an automotive vehicle as set forth in claim 1, wherein said extending portions are integrally formed with said auxiliary frames.

6. A vehicle body structure for an automotive vehicle as set forth in claim 1, further comprising:

floor panels connected to said side sills at one side end and said floor tunnel at another side end thereof, wherein said floor tunnel upwardly raises from the side ends of the floor panels connected thereto.

7. A vehicle body structure for an automotive vehicle as set forth in claim 3, wherein said auxiliary frames comprise left and right auxiliary frames which are respectively attached to the left and right surfaces of said floor tunnel.

* * * * *